United States Patent
Hobbs et al.

(10) Patent No.: US 6,462,142 B1
(45) Date of Patent: Oct. 8, 2002

(54) PROCESSES FOR IMPROVED SURFACE PROPERTIES INCORPORATING COMPRESSIVE HEATING OF REACTIVE GASES

(75) Inventors: John Peter Hobbs, Lansdale; Philip Bruce Henderson, Allentown, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/432,980

(22) Filed: Nov. 3, 1999

(51) Int. Cl.$^7$ .................................................. C08F 8/18
(52) U.S. Cl. ................ 525/356; 515/329.1; 515/329.2; 515/329.3; 515/330.3; 515/331.5; 515/331.6; 515/326.2; 515/326.4; 515/332.3; 515/333.3; 515/333.4; 515/333.7; 515/334.1; 528/483
(58) Field of Search ........................... 525/356; 528/483

(56) References Cited

U.S. PATENT DOCUMENTS

| | | |
|---|---|---|
| 2,502,841 A | 4/1950 | Henderson |
| 2,715,075 A | 8/1955 | Wolinski |
| 2,811,468 A | 10/1957 | Joffre |
| 3,916,063 A | 10/1975 | Dratz et al. ................. 428/341 |
| 3,988,491 A | 10/1976 | Dixon et al. ................. 428/288 |
| 4,009,304 A | 2/1977 | Dixon et al. ................. 427/322 |
| 4,020,223 A | 4/1977 | Dixon et al. ................. 428/224 |
| 4,081,574 A | 3/1978 | Hawkins et al. ............. 427/237 |
| 4,142,032 A | 2/1979 | D'Angelo .................... 526/43 |
| 4,237,156 A | 12/1980 | Boultinghouse .......... 427/255.1 |
| 4,296,151 A | 10/1981 | Boultinghouse ............ 427/255 |
| 4,404,256 A | 9/1983 | Anand et al. ................ 428/409 |
| 4,439,126 A | 3/1984 | Fukushima et al. ......... 425/135 |
| 4,484,954 A | 11/1984 | Tarancom .................... 148/6.3 |
| 4,743,419 A | 5/1988 | Bierschenk .................. 264/83 |
| 4,752,428 A | 6/1988 | Williams et al. ............. 264/83 |
| 4,764,405 A | 8/1988 | Bauman et al. .............. 428/35 |
| 4,800,053 A | 1/1989 | Bauman et al. .............. 264/83 |
| 4,830,810 A | 5/1989 | Ufer et al. ................... 264/40.1 |
| 5,484,651 A | 1/1996 | Sasaki et al. ................ 428/224 |
| 5,487,810 A | 1/1996 | Thurm et al. ................ 216/67 |
| 5,654,378 A | 8/1997 | Dehennau et al. ........ 525/333.7 |
| 5,744,257 A | 4/1998 | Blatt ........................... 428/703 |

FOREIGN PATENT DOCUMENTS

| | | |
|---|---|---|
| DE | 2412025 | 3/1974 |
| EP | 214635 | 9/1986 |
| EP | 214635 | 3/1987 |
| EP | 502303 | 1/1992 |
| EP | 629654 | 4/1994 |
| EP | 0629654 | 4/1994 |
| EP | 678547 | 4/1995 |
| JP | 62140821 | 12/1985 |
| WO | 9535341 | 12/1995 |

OTHER PUBLICATIONS

Derwent Search Abstract for EP629654 and German translation "A Method for Pretreating Surfaces of Plastic Parts to be Lacquered".
Derwent Search Abstract for JP 1075231.
Derwent Search Abstract for JP 63221030.
Derwent Search Abstract for DE 3532086.
Derwent Search Abstract for WO 9535341.
Derwent Search Abstract for JP 01172249 (with Japanese patent w/o translation).
STN International file search JP 10101830.
STN International file search JP 10204195.

*Primary Examiner*—Bernard Lipman
(74) *Attorney, Agent, or Firm*—Geoffrey L. Chase

(57) ABSTRACT

An apparatus and method are used to modify the surface chemistry of an article. The article to be surface treated has at least a surface region that includes at least one polymer. The method comprises the steps of placing one or more articles into a closed reaction chamber which is evacuated to a negative pressure. After evacuation, a treatment gas is rapidly injected into the reaction chamber, the treatment gas having an essentially predetermined composition comprising one or more components which are reactive with the articles within the reaction chamber. The treatment gas is allowed to react with the articles within the closed reaction chamber for a predetermined period of time. The treatment gas is then removed from within the reaction chamber and replaced with an inert gas at about atmospheric pressure. Finally, the treated articles are removed from the treatment chamber.

43 Claims, 2 Drawing Sheets

PROCESSES FOR IMPROVED SURFACE PROPERTIES INCORPORATING COMPRESSIVE HEATING OF REACTIVE GASES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a process and an apparatus for improving the surface properties of polymers, such as improving adhesion or improving wicking, i.e., conveying liquid by capillary action.

Existing technologies for surface treating polymers include abrasive buffing, etching, solvent washing, chlorinated polyolefin (CPO) treatment, exposure to corona or glow discharge treatments, and plasma or flame treatments. Fluorination and oxyfluorination technologies also exist. Each of these technologies has its own shortcomings.

Subjecting a polymer surface to abrasive buffing and etching (solvent or otherwise) makes it difficult to obtain a smooth and lustrous paint coating on the polymer surface thereafter. Solvent washing and CPO treatments generate large volumes of waste by-products and use solvents which contribute to volatile organic compound emissions if not captured and destroyed. Corona and glow discharge treatments tend to age and become ineffective with time. Plasma and flame treatments do not provide a homogeneous surface modification on a convoluted part.

The disadvantages of present fluorination and oxyfluorination processes having surface modification as an objective are manifest. Some of these processes need substantial apparatus because they entail moving the fluorine gas from a holding chamber to a reaction chamber and back again. Substantial apparatus may also be required because these processes use very high concentrations of fluorine or relatively long treatment cycles during which pressure is increased gradually. As more apparatus is required, costs increase. Processes utilizing fluorine pose a threat to safety because fluorine is a highly toxic, highly corrosive, irritating gas. Any process that uses relatively high temperatures, pressure, concentrations and/or volumes of fluorine is hazardous due to an increased possibility of fire or leakage. Finally, these processes raise the pollution factor because of the amount of fluorine and/or fluorine by-products, such as hydrogen fluoride, which must be disposed of after the completion of the fluorination process.

Numerous attempts have been made to improve the surface properties of polymers. For example, U.S. Pat. No. 5,654,378 (Dehennau et al) discloses articles including polyolefins which are surface treated and printed with inks, such as PVC inks. The article surface includes fluorine and oxygen in concentrations such that the oxygen/carbon atom ratio at a depth of 1.5 nm is at least 0.08 and the fluorine/carbon atom ratio is at least 90% but not more than 290% of the oxygen/carbon atom ratio.

U.S. Pat. No. 5,654,378 also relates to a process for the manufacture of such articles that involves an oxidation stage and a fluorination stage. By example, the patent shows that an ambient temperature, sub-ambient pressure fluorination or fluoroxidation process which exposes a polymer to approximately 20 millibars of $F_2$ for approximately seven minutes by gradually raising the gas pressure over approximately 5 minutes from 200 millibars to 400 millibars at a rate of 40 millibars per minute for a total fluorine exposure time of approximately fifteen minutes can provide an ink-receptive surface, particularly when the oxygen content on the surface is high.

European Patent Application Publication No. 0-502-303-A1 teaches a process for the treatment of objects with a gas containing fluorine as well as an arrangement for carrying out the process. In particular, the publication teaches the design of fluorination equipment that is arranged to be operated always in a sub-ambient pressure mode with fluorine being recycled. It is silent on the rate of pressurization.

U.S. Pat. No. 4,752,428 (Williams et al) teaches a process for making shaped articles by injecting a thermoplastic or thermoset polymer into a mold cavity in which a concentration of fluorine and oxygen is contained at atmospheric pressure while the polymer is being injected into the mold. The process results in shaped articles having altered physical and chemical characteristics, including improved surface adhesion.

U.S. Pat. No. 4,764,405 (Bauman et al) discloses a method for improving the barrier properties of thermoplastic substrates. A surface of the thermoplastic substrate is contacted with a reactive gas stream having a particular concentration of fluorine and oxygen.

U.S. Pat. No. 4,743,419 (Bierschenk) teaches an on-line film fluorination apparatus cooperative with a continuous polymer film extruding apparatus. In one embodiment, a continuous feed film is introduced into a closed cabinet having guide rollers for directing the film into a housing. The film passes around a roller formed of sintered nickel to enable gaseous impregnation of a surface of the film with a gas flow including fluorine. The gas acts on the exposed face of the film, changing the surface of the polymer film, thereby providing a relatively thick surface upgrading of the film. After exposure to the fluorine, the film passes a closed vacuum container having an open face for drawing off unreacted fluorine for recapture and recycling. The film emerges from the closed cabinet having a modified surface and the cabinet is evacuated with a slight negative pressure.

U.S. Pat. No. 4,484,954 (Tarancon) teaches a process for the halogenation of solid polymeric or metallic material. A halogen is introduced into an evacuated chamber and is recirculated.

U.S. Pat. No. 4,404,256 (Anand et al) relates to low energy fluorinated polyolefin surfaces and to fluorinated polymers produced therewith. This patent teaches plasma fluorinations of surfaces to obtain lightly fluorinated oxygen-free surfaces of less than 200 Angstroms.

U.S. Pat. Nos. 4,296,151 and 4,237,156 (Boultinghouse) each teach treating the surface of a solid article made from a polymer, such as polyolefin or polystyrene, with a fluorine-containing gas to render the article receptive to adhesion.

U.S. Pat. No. 4,142,032 (D'Angelo) teaches a process for achieving significant improvements in the barrier properties of polymeric articles such as films and containers by surface treatment with both fluorine and bromine.

U.S. Pat. No. 4,081 574 (Hawkins et al) discloses an apparatus and process for exposure of articles to reactive gaseous fluids to alter their surface characteristics. The articles are exposed to one or more fluids which are transferred back and forth from a reaction chamber to a holding chamber. As the fluids are transferred, they pass through a trap designed to remove reaction by-products without affecting valuable reactant fluids.. Since the fluids can be transferred under vacuum and the overall reaction can take place at relatively low temperature, the process provides a convenient and safe method for handling reactive fluids. The process is particularly useful for the fluorination of a variety of articles such as plastic containers, aerosol bottles and films to improve their barrier resistance to solvents and gases.

U.S. Pat. No. 4,020,223 (Dixon et al) teaches surface modification of polyolefin and polyacrylonitrile fibers using elemental fluorine and low oxygen blends for improved oil release and moisture transport characteristics.

U.S. Pat. No. 4,009,304 (Dixon et al) teaches a process for improving adhesion of polyester yarn, tire cord or fabric and polyester reinforced rubber goods such as tires. Improved adhesion is achieved by fluorinating the polyester yarn, tire cord or fabric prior to incorporation into the tire or rubber goods.

U.S. Pat. No. 3,988,491 (Dixon et al) discloses a process for improving dye receptivity and soil and stain release properties of fiber-formed materials, such as polyesters and polyamides. The improved properties are achieved by subjecting the fibers to fluorine treatment in the presence of little or no oxygen for brief periods of time.

U.S. Pat. No. 3,413,266 (Saines et al) teaches fluorination of polycarbonate films using elemental fluorine at sub-ambient pressures.

U.S. Pat. No. 2,811,468 (Joffre) teaches post-treatment of polyethylene films and containers to improve gas barrier properties.

U.S. Pat. No. 2,715,075 (Wolinski) relates to a process for treating the surface of polyethylene structures, particularly polyethylene film, to promote the adhesion thereto of printed inks and various other materials.

U.S. Pat. No. 2,502,841 (Henderson) relates to polyethylene structures in which the surface which is to receive ink compressions has been modified so that the dried ink compressions will firmly and tenaciously adhere thereto. The patent also teaches a method for preparing such surfaces.

U.S. Pat. No. 4,830,810 (Ufer et al) teaches a method of blow molding and fluorinating plastic containers that is carried out in essentially three steps including blow molding of the container at a predetermined pressure in a mechanically locked mold with an inert gas, testing the meld for pressure tightness at a second higher level of pressure with an inert gas and thereafter introducing a fluorine containing gas into the mold at a third level of pressure.

U.S. Pat. No. 5,487,810 (Thurm et al) teaches use of sulphur hexafluoride plasma to improve the surface characteristics of plastic components for the adhesion of coatings especially metal coatings. Under this method, the plastic surfaces are kept free of fluorine deposits or inclusions during the pre-treatment.

U.S. Pat. No. 5,484,651 (Sasaki et al) teaches improving the hydrophilicity of polyolefin non-woven fabric webs by exposing them to fluorine and oxygen.

U.S. Pat. No. 5,744,257 (Carstens) teaches a process for producing a composite material comprising a cementitious substrate which is strengthened or reinforced with reinforcing material which adheres thereto. Adhesion of the substrate component to the reinforcing component is enhanced by subjecting the reinforcing component to surface fluorination prior to bringing the components into contact with each other.

While the aforementioned processes may be suitable for their intended purposes, it would be a significant advance in the art to provide a process for rendering the surface of a polymer adherent with other materials by exposing it to a fluorine gas, wherein the process could be performed in a relatively shorter cycle time, with a relatively lower concentration of fluorine and utilizing relatively less apparatus .

It is desired to have a process and an apparatus for improving the surface properties of polymers which reduce the amount of treatment gas utilized during the process.

It is further desired to have a process and an apparatus for improving the surface properties of polymers which reduce the cycle time for treatment during the process.

It is still further desired to have a process and an apparatus for improving the surface properties of polymers which overcome the disadvantages of the prior art.

It is still further desired to have a process and an apparatus for improving the surface properties of polymers which are simpler and more economical than the prior art.

It is still further desired to have a process and an apparatus for improving the surface properties of polymers which are more reliable in operation than the prior art.

It is still further desired to have a process and an apparatus for treating a polymer surface to render the surface receptive to other materials such as adhesives, glues, coatings, paints, inks, decorations, and the like.

It is still further desired to have a process and an apparatus for treating a polymer surface to render the surface receptive to adhesion with other dissimilar polymers.

It is still further desired to have a process and an apparatus for improving the surface properties of polymers in a reduced cycle time.

It is still further desired to have a process and an apparatus for improving the surface adhesion of polymers that require the use of lower concentrations of treatment. gas.

It is still further desired to have a process and an apparatus for improving the surface adhesion of polymers wherein toxic treatment gas can be evacuated more easily from the reaction vessel.

It is still further desired to have a process and an apparatus for improving the surface adhesion of polymers wherein toxic treatment gas can be disposed of more easily and economically.

It is still further desired to have a process and an apparatus for improving the surface adhesion of polymers that enable use of a smaller reaction vessel.

It is still further desired to have a process for improving the surface adhesion of polymers that utilizes less apparatus.

It also is desired to have a process and an apparatus for improving the surface adhesion of polymers that results in more uniform distribution of treatment gas throughout the reaction chamber.

BRIEF SUMMARY OF THE INVENTION

The present invention discloses methods and an apparatus for modifying the surface chemistry of an article having at least one surface region that includes at least one polymer. The invention involves exposing the article to a treatment gas in a reaction chamber. Lower concentrations of treatment gas are required to achieve the same improved surface properties as achieved under the prior art. Also, shorter cycle times are required to achieve the same improved surface properties as achieved under the prior art. In addition, since lower concentrations of treatment gas are utilized, evacuation from the reaction chamber is easier, and lower quantities of waste are generated, making disposal less costly.

A first embodiment includes multiple steps. The first step is to place one or more articles in a closed reaction chamber, which is evacuated to a suitable negative pressure. After evacuation, a treatment gas is rapidly injected into the reaction chamber, the treatment gas having an essentially predetermined composition comprising one or more components which are reactive with the articles within the reaction chamber. The treatment gas is allowed to react with the articles within the closed reaction chamber. The treatment gas is then removed from within the reaction chamber and is replaced with an inert gas at about atmospheric pressure. Finally, the treated articles are removed from the reaction chamber. The method described herein may be utilized for improving the adhesion of the articles with other materials such as paint, adhesives or dissimilar polymers. Alternatively, the method may be utilized for improving the wicking ability of the articles.

The articles to be surface treated under this invention include at least one surface that is formed of a polymer that is amenable to surface modification by the treatment gas. The polymeric surface may be of a thermoplastic or a thermoset polymer. The polymeric material may be elastomeric in nature. The polymeric surface may be formed of a polymer or copolymer of olefins, styrenes, dienes, epoxies, vinyl or vinylidene chloride or fluoride, polycarbonates, polyesters, polyethers, polyacetals, polyacrylates, polymethacryates, polyamides, polyimides, polysulfones, polyphenylene ethers, polyaryletherketones and the like and blends thereof that are found amenable to surface modification.

In the first embodiment, the treatment gas is a mixture of fluorine and oxygen in an inert gas diluent. For example, the mixture may include from about 0.01% to about 1% fluorine and from about 0.01% to about 21% oxygen. Possible diluents include but are not limited to carbon dioxide, $SF_6$, nitrogen, dry air, argon, and helium.

In the first embodiment, the treatment gas is stored in a storage vessel prior to being transferred into the reaction chamber. In one variation, the storage vessel may be of a fixed volume with the treatment gas stored therein being maintained at a pressure above atmosphere. Under this variation, the reaction chamber is maintained at a negative pressure. When the storage vessel is placed in communication with the reaction chamber, treatment gas is rapidly injected into the reaction chamber through pressure equalization. In another variation, the storage vessel may be of a construction that allows its volume to decrease, such as a piston-within-a-cylinder or a gas bladder type construction. Under this variation, treatment gas is rapidly injected into the reaction chamber by decreasing the volume of the storage vessel by movement of the piston within the cylinder or compression of the gas bladder rather than through pressure equalization.

In another variation of the first embodiment, the treatment gas is injected into the reaction chamber by sparging or spraying to ensure a good distribution of the treatment gas over the surface of the articles placed within the reaction chamber.

In another variation of the first embodiment, the treatment gas is held in static contact with the article.

In another variation of the first embodiment, the treatment gas is agitated within the reaction chamber to ensure a good distribution of the treatment gas over the surface of the articles placed within the reaction chamber.

In another variation of the first embodiment, the treatment gas is rapidly injected until the reaction chamber reaches an absolute pressure of approximately 900 millibars.

In another variation of the first embodiment, the reaction chamber is evacuated to an absolute pressure of no more than approximately 200 millibars and preferably no more than approximately 10 millibars prior to injection of the treatment gas into the reaction chamber.

In another variation of the first embodiment, the treatment gas is rapidly injected into the reaction chamber within a time period of about one second.

In another variation of the first embodiment, the treatment gas is rapidly injected into the reaction chamber at a rate sufficient to cause a temperature increase within the reaction chamber of at least five degrees Celsius (5° C.).

In another variation of the first embodiment, the treatment gas is allowed to react with the articles placed within the reaction chamber for at least about 0.5 seconds and no more than ten seconds.

In another variation of the first embodiment, the step of removing the treatment gas from within the reaction chamber includes the sub-step of flowing a predetermined quantity of an inert gas through the reaction chamber after the reaction.

In another variation of the first embodiment, the step of removing the treatment gas from within the reaction chamber includes the sub-steps of creating a vacuum within the reaction chamber and thereafter flowing a predetermined quantity of an inert gas through the reaction chamber.

In another variation of the first embodiment, the step of rapidly injecting a treatment gas into the reaction chamber includes the sub-step of pressurizing the reaction chamber at a rate of pressurization of no less than 100 millibars per second, wherein a concentration of fluorine in the treatment gas is less than about 20%.

In another variation of the first embodiment, the step of rapidly injecting a treatment gas into the reaction chamber includes the sub-step of pressurizing the reaction chamber with the treatment gas at a pressurization rate of between approximately 500 millibars per second and approximately 8000 millibars per second. Under this variation, the treatment gas is injected into the reaction chamber in less than about two seconds and the concentration of fluorine in the treatment gas is approximately 100 ppm. The treatment gas is allowed to react with the articles within the closed reaction chamber for a time period of approximately five seconds.

In another variation of the first embodiment, the treatment gas is injected into the reaction chamber at a predetermined rate of pressurization of at least no less than approximately 50 millibars per second and preferably more than approximately 200 millibars per second and most preferably more than approximately 500 millibars per second.

In another variation of the first embodiment, the treatment gas is rapidly injected into the reaction chamber within a time period of about five seconds.

In another variation of the first embodiment, the treatment gas is rapidly injected into the reaction chamber within a time period of about ten seconds.

In yet another variation of the first embodiment, the treatment gas is removed from the reaction chamber by evacuation.

A second embodiment has one step in addition to the steps in the first embodiment. The additional step is to preheat the treatment gas to a selected temperature, e.g., in the range of about 30 to about 60 degrees Celsius (°C.), while the treatment gas is contained within the storage vessel. In a variation of this second embodiment, the treatment gas may be preheated once it has left the storage vessel as it is being rapidly injected into the reaction chamber.

A third embodiment has one step in addition to the steps in the first embodiment. The additional step is to monitor the pressure within the reaction chamber and within the storage vessel during the steps of evacuating the reaction chamber, injecting the treatment gas, and reacting the treatment gas with the articles placed within the reaction chamber.

A fourth embodiment has one step in addition to the steps of the first embodiment. The additional step is to introduce a neutralizing gas into the reaction chamber to lessen the toxicity of the treatment gas prior to removing the treatment gas from within the reaction chamber. In a variation of the fourth embodiment, the treatment gas includes a concentration of fluorine and the neutralizing gas includes a concentration of hydrogen. The neutralizing gas reacts with the treatment gas within the reaction chamber to form hydrogen fluoride.

The present invention also includes an apparatus for modifying the surface chemistry of an article, the article having at least one surface region including at least one polymer. The apparatus includes (1) a closed reaction chamber adapted to receive the article; (2) means for evacuating the reaction chamber to a negative pressure; (3) means for rapidly injecting a treatment gas into the reaction chamber, the treatment gas having an essentially predetermined composition comprising one or more components which are reactive with the at least one article within the reaction chamber; (4) means for removing the treatment gas from within the reaction chamber; and (5) means for replacing the treatment gas with an inert gas at about atmospheric pressure.

DETAILED DESCRIPTION OF THE INVENTION

The process includes placing the polymer within a closed reaction chamber and exposing the polymer surface to treatment gas containing fluorine, the treatment gas being introduced into the reaction chamber at a rate sufficient to cause a temperature rise within the chamber due to rapid compression of the treatment gas. This temperature rise, hereafter referred to as adiabatic heating, has been found to increase the rate of fluorination of the polymeric surface.

Figure 1:
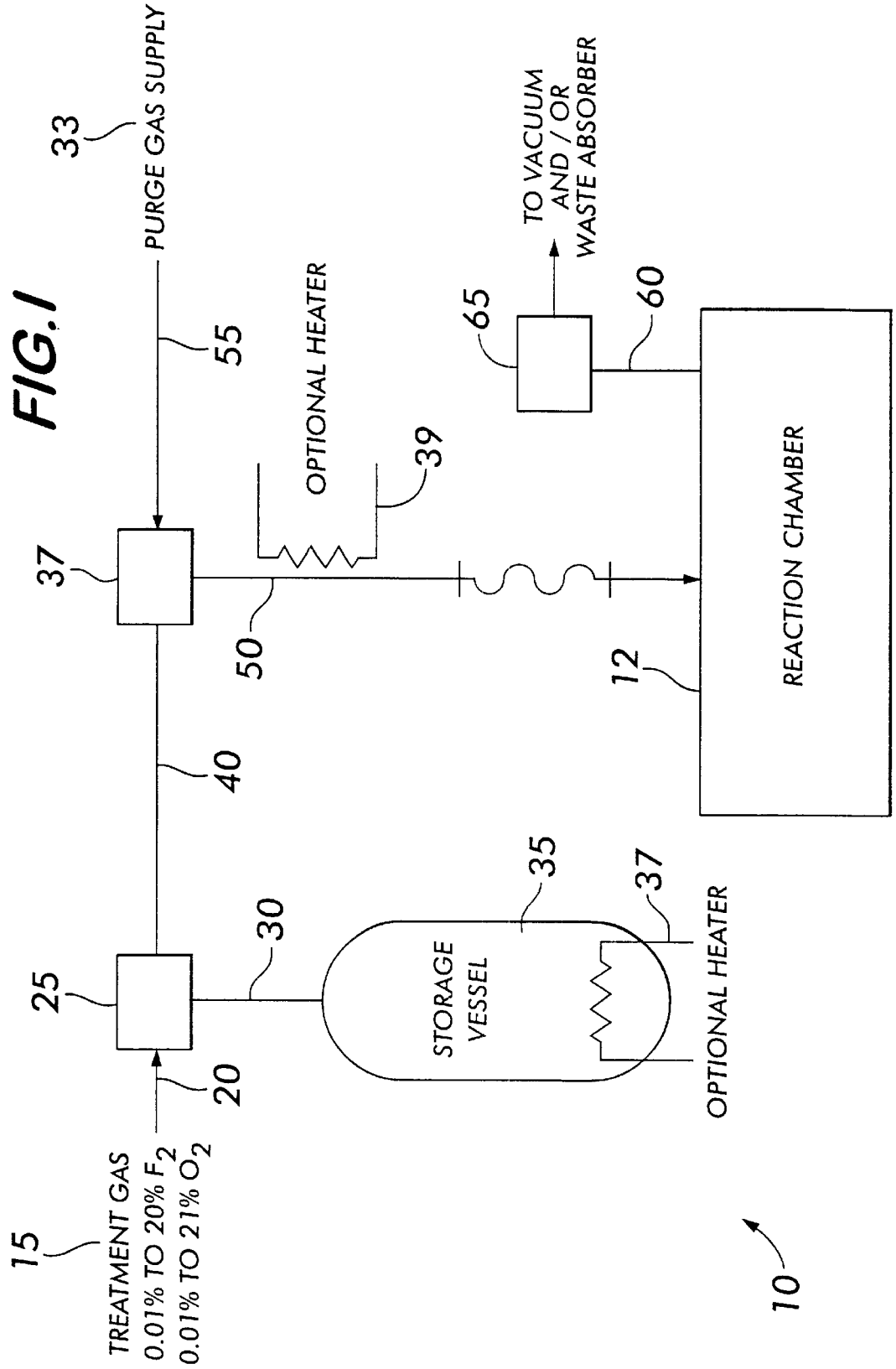
FIG. 1 is a schematic diagram of an apparatus for practicing the method of the present invention.

Referring now to the drawings, wherein like reference numerals refer to like parts, there is shown in FIG. 1 a flow diagram illustrating a preferred embodiment of the process and apparatus 10 of the present invention. The reaction chamber 12 may be of any suitable size, e.g., 100 liters, and shape to permit easy placement and removal of one or more articles to be surface treated. The reaction chamber 12 may be formed of any suitable material, e.g., stainless steel, and may be of any suitable construction known in the art.

The articles to be surface treated include at least one surface region formed of a polymer amenable to surface modification, including but not limited to polymers and copolymers, whether of a thermoplastic or thermoset nature, of olefins, styrenes, dienes, acrylonitrile, epoxies, vinyl or vinylidene chloride or fluoride, polycarbonates, polyesters, polyethers, polyacetals, polyacrylates, polymethacryates, polyamides, polyimides, polysulfones, polyphenylene ethers, polyaryletherketones or the like and blends thereof that are found amenable to surface modification. Also, articles having at least one surface region formed of an elastomeric material, including but not limited to thermoplastic or thermoset, vulcanized or unvulcanized, polymer and copolymer elastomers of olefins, including chlorinated and partially fluorinated olefins, styrenes, dienes, acrylonitrile and the like, may be surface treated in accordance with the method and apparatus of the present invention. Exemplary articles that benefit from the surface treatment of the present invention include, but are not limited to, automotive bumpers, reflective turn signal light enclosures, rocker panels, tool handles, gaskets, electrochemical cell or separation membranes, plastic sheet goods, and fibers to be fabricated into finished products. The articles to be surface treated are placed in the reaction chamber 12 before introduction of treatment gas into the reaction chamber 12.

After the articles are placed in the reaction chamber 12, the reaction chamber is evacuated to a suitable negative pressure to substantially remove the ambient air. The reaction chamber 12 should be evacuated to a pressure of no more than approximately 200 millibars and preferably no more than approximately 10 millibars. A portion of the original ambient air may be left in the reaction chamber to supply oxygen for the surface treatment.

Referring now to FIG. 1, a source 15 of treatment gas contains a concentration of fluorine ($F_2$), preferably 1%, and a concentration of oxygen ($O_2$), preferably 21%, in a diluent being provided at a predetermined level of pressurization, e.g., 60 p.s.i.g. Other concentrations of fluorine may be utilized, e.g., any concentration of fluorine from approximately 0.01% up to approximately 20%. Likewise, other concentrations of oxygen may be utilized, e.g., any concentration of oxygen from approximately 0.01% up to approximately 21%. The diluent may be any inert gas and preferably is carbon dioxide, $SF_6$, nitrogen, dry air, argon, or helium. However, other ambient gases may be utilized as a diluent. The treatment gas flows from the source 15 through a supply conduit 20 to a conventional valving arrangement 25, e.g., one or more isolation valves or ball valves. The valving arrangement 25 directs the flow of the treatment gas in one of two directions. In the first direction, the valving arrangement 25 directs the treatment gas from the supply conduit 20 downwardly through a supply conduit 30 and into a storage vessel 35.

The storage vessel 35 may be of any suitable volume that will prevent overfilling of the reaction chamber 12 during pressure equalization of the storage vessel 35 with the reaction chamber 12. Thus, in determining the volume of the storage vessel 35, consideration must be given to parameters including, but not limited to, the volume of the reaction chamber 12, the negative pressure to which the reaction chamber 12 will be evacuated prior to pressure equalization, and the level of the pressurization of the treatment gas to be stored in the storage vessel 35. The storage vessel 35 may be of a fixed volume or may be of a construction that allows its volume to decrease, such as a piston-within-a-cylinder type construction. Under a piston-within-a-cylinder or collapsible bladder type construction, rather than pressurizing the reaction chamber 12 by means of pressure equalization, the treatment gas may be rapidly injected from the storage vessel into the reaction chamber by utilizing the piston to eject the treatment gas from the storage vessel. Under a collapsible bladder type construction, rather than pressurizing the reaction chamber 12 by means of pressure equalization, the treatment gas may be rapidly injected from the storage vessel into the reaction chamber by collapsing the bladder under external pressure.

The storage vessel 35 is pressurized with treatment gas to a predetermined level of pressurization above atmospheric pressure, e.g., 2 bars. For safety reasons, once the pressure within the storage vessel 35 has reached the predetermined level, the valving arrangement 25 should be moved to isolate the storage vessel 35 from the source 15 of treatment gas. Moreover, the storage vessel 35 remains mechanically isolated from the reaction chamber 12 until the storage vessel 35 has been pressurized to its predetermined level. In the event pressure of the treatment gas within the supply conduit 30 exceeds a maximum operating pressure, the treatment gas may be bled off to a scrubber (not shown) in ways known in the art.

Once it has been determined that the predetermined level of pressure has been reached within the storage vessel 35, the treatment gas may be rapidly injected into the reaction chamber 12 by pressure equalization or by other means discussed above. In particular, valving arrangements 25 and 37 may be turned to direct the treatment gas stored within the storage vessel 35 through supply conduits 30, 40 and 50 and into the reaction chamber 12. Due to the pressure differential existing between the storage vessel 35, which has been pressurized well above atmospheric pressure, and the reaction chamber 12, which has been evacuated to below atmospheric pressure, the treatment gas travels rapidly from the storage vessel 35 to the reaction chamber 12, raising the pressure within the reaction chamber 12 up to approximately atmospheric pressure. Introduction of the treatment gas in this manner is known as pressure equalization.

The rapid transfer of the treatment gas into the reaction chamber 12 and compression therein causes adiabatic heating within the reaction chamber to accelerate the desired surface modification. To obtain adiabatic heating, the treatment gas should be injected into the reaction vessel 12 at a rate of no less than 50 millibars per second. It is preferable to inject the treatment gas into the reaction chamber at considerably higher rates, e.g., more than approximately 200 millibars per second, and most preferably at a rate of pressurization of more than approximately 500 millibars per second. In any event, the treatment gas should be injected into the reaction chamber in a manner that will cause a temperature increase within the reaction chamber due to adiabatic heating of at least five degrees Celsius (°C.). Introduction of the treatment gas into the reaction chamber 12 through rapid pressurization provides a more even distribution of the treatment gas within the chamber and results in improved uniformity in surface adhesion of the article surface treated therein. Under prior art methods, spotty adhesion can result where the treatment gas is flowed through an open reaction chamber at atmospheric pressure.

Although it is preferable for pressure equalization to occur within a short period of time, e.g., less than one second, adiabatic heating also can be achieved where pressure equalization occurs over longer time periods, e.g., five seconds or even as much as ten seconds. Of course, where pressure equalization takes place over a longer time period, less adiabatic heating occurs within the reaction chamber 12. Thus, where pressure equalization takes longer, to obtain the same degree of surface modification, one or more other parameters must be adjusted accordingly, such as increasing the concentration of fluorine in the treatment gas and/or heating the treatment gas prior to rapid injection into the reaction chamber 12 and/or increasing the exposure time of the article to the treatment gas. The process of introducing a treatment gas into the reaction chamber 12 by rapid pressure equalization generally results in a good mixing of the treatment gas with the articles placed therein. It may be necessary to supplement this method of gas introduction by sparging to ensure a good distribution of the treatment gas over the surface of the articles placed within the reaction chamber 12.

After pressure equalization, the treatment gas is held in contact with the one or more polymeric surfaces of the articles for a predetermined period of time to complete the desired surface modification. Preferably, the treatment gas is allowed to react with the articles within the reaction chamber for at least about 0.5 seconds and no more than ten seconds. To obtain the same degree of surface modification while decreasing the time the articles are exposed to the treatment gas, other parameters must be adjusted accordingly, such as increasing the rate of pressurization or increasing the concentration of fluorine in the treatment gas.

The treatment gas may be held statically in contact with the polymeric surface or may be agitated within the reaction chamber 12. Gas agitation will contribute to correcting any non-uniformities in gas distribution that may exist within the reaction chamber. Since adiabatic heating is occurring, less exposure time is required to obtain the same surface characteristics.

For example, by rapidly injecting into the reaction chamber 12 a treatment gas having a fluorine concentration of 100 ppm resulting in a pressure rise within the chamber from 500 millibars to 8,000 millibars per second and thereafter exposing articles placed therein to the treatment gas for a period of five seconds, a more beneficial surface treatment can be achieved than by flowing the same treatment gas having the same fluorine concentration through an open reaction chamber isobarically for the same period of time.

Referring again to FIG. 1, the storage vessel 35 is provided with an optional heating element 37. Treatment gas located within the storage vessel 35 may be heated to a selected temperature, e.g., in the range of about 30 to about 60 degrees Celsius (°C.), prior to being injected into the reaction chamber 12. The heating element 39 may optionally be placed in or on the supply conduit 50 to heat the treatment gas while it is being injected into the reaction chamber 12.

Finally, in one or more steps, the residual treatment gas and by-product gas are displaced from the reaction chamber through an exhaust conduit 60 to an exhaust apparatus 65. The treatment gas may be removed from the reaction chamber 12 in one of several ways. Under a first evacuation method, the reaction chamber 12 may be evacuated one or more times to remove the treatment gas until a tolerable level of residual harmful gases within the reaction chamber 12 has been reached. Since lower concentrations of fluorine are utilized under the invention, fewer evacuation steps are required and the evacuation apparatus can be less robust. A portion of this gas may be recovered for reuse by processes known in the prior art. Such processes are shown, for example, in U.S. Pat. No. 4,439,126, (Fukushima et al) disclosure of which is hereby incorporated by reference.

Under the second evacuation method, a predetermined quantity of an inert gas is flowed through the reaction chamber 12 to cleanse from the reaction chamber 12 any residual harmful gases. Any suitable inert gas may be employed for purging the reaction chamber 12, such as nitrogen at ambient pressure or preferably filtered room air. A source or supply of purging gas 33 is injected into the reaction chamber through a purge conduit 55, through valving arrangement 37 and through the supply conduit 50. Preferably, an amount of inert purging gas equal to at least three volume changes of the reaction chamber should be flowed therethrough to ensure the removal of any and all harmful gases. Although the supply conduit 50 is shown as supplying both the treatment gas and the inert gas for purging, it should be understood that preferably, the purging gas should be introduced into the reaction chamber 12 through a supply conduit separate and isolated from the supply conduit 50 to prevent the introduction of residual fluorine remaining within the supply line 50 into the reaction chamber 12 during purging of the reaction chamber 12. Alternatively, under this method, the reaction chamber 12 may be evacuated one or more times prior to flowing an inert purging gas therethrough.

Under a third evacuation method, treatment gas within the reaction chamber may be neutralized by reacting it with a suitable neutralizing gas such as hydrogen to form hydrogen fluoride and thereafter recovering the neutralized gas from the reaction chamber 12 through an exhaust conduit 60 to a exhaust apparatus 65. Residual amounts of fluorine remaining within the supply conduits 20, 30, 40 and 50 may be isolated or removed in ways known in the art to prevent exposure to fluorine once the reaction chamber 12 is opened. Thereafter, the reaction chamber 12 may be opened and the articles removed.

It will be obvious to persons skilled in the art that certain changes may be made in the methods described above without departing from the scope of the invention. It is therefore intended that all matter herein disclosed be interpreted as illustrative only and not as limiting the scope of protection sought. Moreover, the process of the present invention is not to be limited by the specific examples set forth below including the table and figure to which they refer. Rather, these examples and the table and figure they refer to are illustrative of the process of the invention.

EXAMPLE 1

This example is to demonstrate the adiabatic heat rise of a gas resulting from compression of the gas that occurs when the gas is rapidly injected into a closed reaction chamber. The reaction chamber utilized in this example is a cylindrical stainless steel tube having an inside diameter of approximately 2.2 centimeters (cm) and a length of approximately 32 cm. The reaction chamber is provided with a 36 gauge type-J thermocouple for measuring temperature inside the reaction chamber before, during and after injection of the gas. Each end of the cylindrical tube is closed by an end cap also formed of stainless steel. Under this example, no articles are placed in the reaction chamber for surface treatment and no fluorine gas was utilized.

Figure 2:
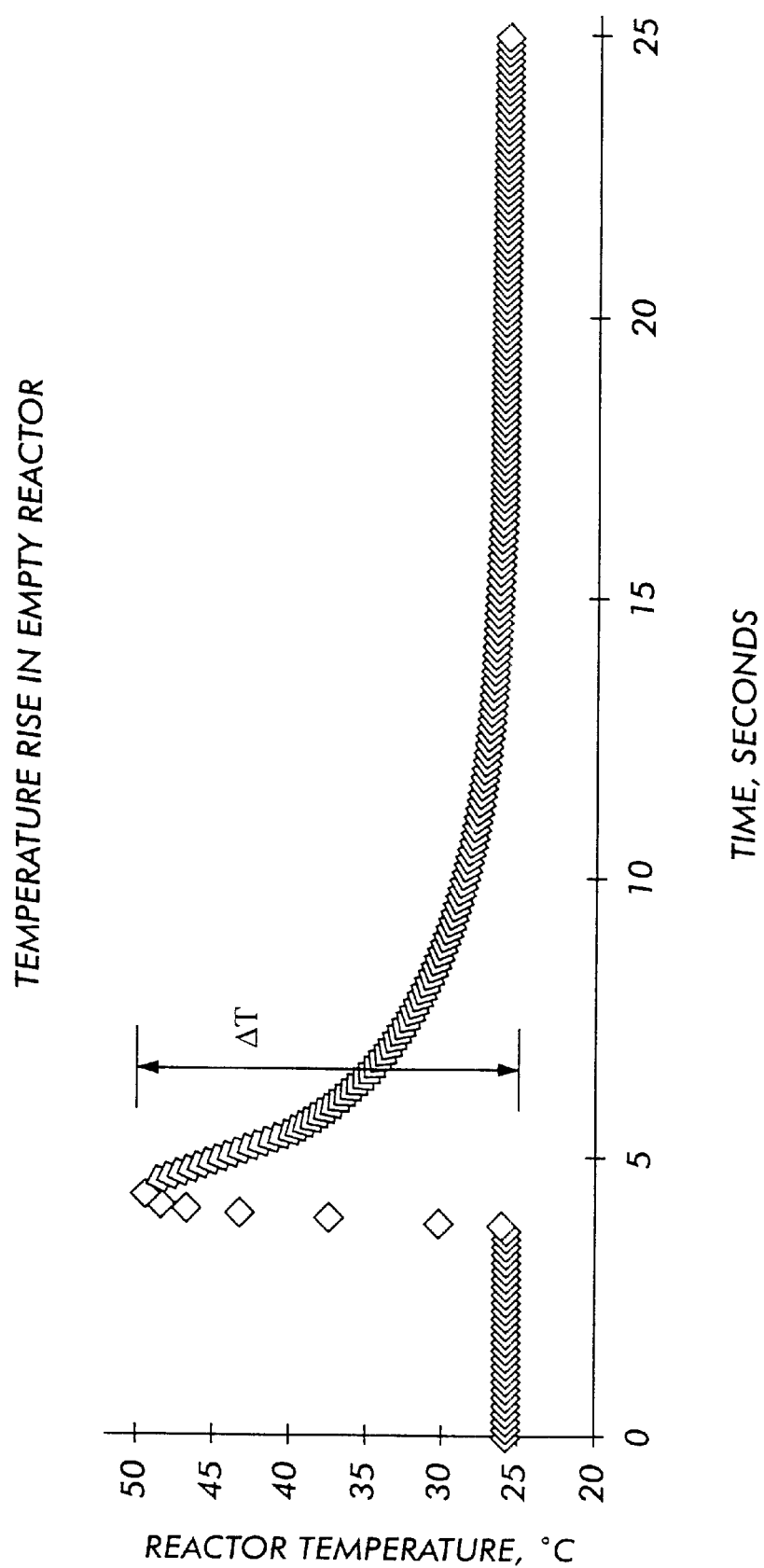
FIG. 2 is a graph illustrating temperature rise due to adiabatic heating in an empty reaction chamber.

The empty reaction chamber is sealed and evacuated to a sub-atmospheric pressure of approximately 10 Torr. A 14 liter storage vessel is filled with nitrogen ($N_2$) to a pressure of approximately 900 Torr. The pressure within the reaction chamber is equalized with the pressure within the storage vessel thus causing the reaction chamber to be quickly filled with $N_2$ from the storage vessel. The temperature within the reaction chamber was monitored during pressure equalization. A plot of reaction temperature versus time is shown in FIG. 2. As demonstrated by FIG. 2, the temperature quickly spikes to a maximum due to the adiabatic heating of the gas resulting from the quick filling of the reaction chamber. FIG. 2 also demonstrates that the temperature slowly decreases as the heat is adsorbed by the walls of the reaction chamber.

The change in temperature for the reaction is defined as the difference between the maximum temperature observed and the starting temperature of the reaction chamber. Under this example, the change in temperature observed was 23.7 degrees Celsius (°C.).

EXAMPLE 2

This example is to demonstrate adhesion performance of fluoroxidized high density polyethylene coupons with adiabatic heating. Seven sets of coupons, three coupons in each set, were placed in the reaction chamber and reacted with various concentrations of fluorine for various exposure times. Each coupon was made of high density polyethylene (HDPE) and measured two centimeters in width by ten centimeters in length by 0.8 centimeters in thickness The reaction chamber utilized in this example was the same as utilized in Example 1. To react the HDPE coupons with a treatment gas with adiabatic heating, the reaction vessel was first evacuated to a sub-atmospheric pressure of approximately 10 Torr and then filled to 800 Torr with the treatment gas in less than one second. The various test concentrations of fluorine in the dry air treatment gas and the various exposure times are illustrated in Table 1 below. After each reaction, the treatment gas was evacuated from the reaction chamber for approximately twenty seconds and then refilled with ambient air. The evacuation and refilling of the reaction chamber was repeated. Each set of the three coupons was analyzed for paint adhesion in accordance with ASTM (American Society for Testing and Materials) D3359-95, the results of which appear in Table 1 below.

Comparative Example 3

This example is to demonstrate adhesion performance of fluoroxidized HDPE coupons in the absence of adiabatic heating. Seven sets of coupons, three coupons in each set, were placed within the reaction chamber and reacted with a treatment gas without adiabatic heating. The HDPE coupons utilized in this example were of the same dimensions and composition as those utilized in Example 2. The reaction chamber utilized in this example was the same as that utilized in the previous two examples except for the fact that it was not evacuated prior to the reaction and was left open during injection of the treatment gas. Various test concentrations of fluorine ($F_2$) in dry air at ambient temperature were flowed through the reaction chamber at 400 standard cubic centimeters per minute for the reaction times indicated in Table 1. Because the reaction chamber remained open, there was no change in pressure within the reaction chamber and thus, no change in temperature. After the reaction time, dry air was flowed through the reaction chamber for one minute. The reaction chamber was then evacuated and refilled with air. Each set of the three coupons was analyzed for paint adhesion in accordance with ASTM D3359-95. Table 1 summarizes the results of these tests, comparing the adhesion performance of coupons reacted with fluorine where adiabatic heating occurred and where no adiabatic heating occurred.

TABLE 1

Adhesion Results for HDPE coupons

| Set Heating | $F_2$/air conc. (ppm) | reaction time (sec) | Adhesion Rating[1] Adiabatic heating | Adhesion Rating[1] no Adiabatic |
|---|---|---|---|---|
| 1 | 100 | 6 | 1B | 0B |
| 2 | 200 | 6 | 3–4B | 0B |

TABLE 1-continued

Adhesion Results for HDPE coupons

| Set Heating | $F_2$/air conc. (ppm) | reaction time (sec) | Adhesion Rating[1] Adiabatic heating | Adhesion Rating[1] no Adiabatic |
|---|---|---|---|---|
| 3 | 200 | 12 | 5B | 4B |
| 4 | 250 | 8 | 5B | 3–4B |
| 5 | 500 | 3 | 4–5B | 1B |
| 6 | 500 | 5 | 5B | 2–3B |
| 7 | 1000 | 2 | 5B | 0–5B[2] |

[1]0B to 5B, 0B = no adhesion, 5B = perfect adhesion.
[2]Coupons had non-uniform performance; coupon at front of reaction chamber had best performance.

The present invention has been set forth with regard to several preferred embodiments, but the full scope of the present invention should be ascertained from the claims which follow.

What is claimed is:

1. A method for modifying the surface chemistry of at least one article, said article having at least one surface region including at least one polymer, comprising the steps of:
   a. placing at least one article in a closed reaction chamber;
   b. evacuating the reaction chamber to a negative pressure;
   c. rapidly injecting a treatment gas into the reaction chamber, the treatment gas having an essentially predetermined composition comprising one or more components which are reactive with the at least one article within the reaction chamber, said step of rapidly injecting including pressurizing the reaction chamber at a rate of pressurization no less than 50 millibars per second;
   d. allowing the treatment gas to react with the at least one article within the closed reaction chamber;
   e. removing the treatment gas from within the reaction chamber; and,
   f. removing the at least one article from the reaction chamber.

2. A method as in claim 1 wherein said method is for surface treating said at least one article to promote adhesion with at least one other material.

3. A method as in claim 1 wherein the treatment gas is a mixture of fluorine and oxygen in a diluent.

4. A method as in claim 1 wherein the reaction chamber is evacuated to an absolute pressure of no more than approximately 200 millibars and preferably no more than approximately 10 millibars prior to injection of the treatment gas into the reaction chamber.

5. A method as in claim 1 wherein the treatment gas is rapidly injected until the reaction chamber reaches an absolute pressure of approximately 900 millibars.

6. A method as in claim 1 wherein the treatment gas is rapidly injected into the reaction chamber within a time period of about one second.

7. A method as in claim 1 wherein said step of removing the treatment gas from within the reaction chamber includes the sub-step of flowing a predetermined quantity of an inert gas through the reaction chamber after the reaction.

8. A method as in claim 1 wherein the treatment gas is allowed to react with the at least one article for at least about 0.5 seconds and no more than ten seconds.

9. A method as in claim 1 wherein said step of allowing the treatment gas to react with the at least one article within the closed reaction chamber includes the sub-step of holding the treatment gas in a static contact with the at least one article.

10. A method as in claim 1 wherein said step of allowing the treatment gas to react with the at least one article within the closed reaction chamber includes the sub-step of agitating the treatment gas within the reaction chamber.

11. A method as in claim 1 wherein the treatment gas is rapidly injected into the reaction chamber at a rate sufficient to cause a temperature increase within the reaction chamber of at least five degrees Celsius (5° C.).

12. A method as in claim 3 wherein said step of rapidly injecting a treatment gas into the reaction chamber includes the sub-step of pressurizing the reaction chamber at a rate of pressurization of no less than 100 millibars per second, wherein a concentration of fluorine in the treatment gas is less than about 20%.

13. A method as in claim 1 wherein said step of rapidly injecting a treatment gas into the reaction chamber includes the sub-steps of:
   storing the treatment gas in a storage vessel having a volume; and,
   transferring the treatment gas from the storage vessel to the reaction chamber by pressure equalization.

14. A method as in claim 13 wherein the treatment gas is stored above atmospheric pressure.

15. A method as in claim 13 comprising the further step of monitoring the pressure within the reaction chamber and within the storage vessel during at least steps b and d.

16. A method as in claim 1 wherein said step of rapidly injecting a treatment gas into the reaction chamber includes the sub steps of:
   storing the treatment gas in a storage vessel having a volume; and,
   transferring the treatment gas from the storage vessel to the reaction chamber by decreasing the volume of the storage vessel.

17. A method as in claim 16 wherein the storage vessel has a piston-within-a-cylinder type construction.

18. A method as in claim 1 comprising the further step of heating the treatment gas to a selected temperature prior to rapidly injecting the treatment gas into the reaction chamber.

19. A method as in claim 18 wherein said selected temperature is in the range of about 30 to about 60 degrees Celsius (°C.).

20. A method as in claim 1 wherein said at least one polymer is a polyolefin.

21. A method as in claim 20 wherein said polyolefin is a non-woven fabric material.

22. A method as in claim 1 wherein the treatment gas is injected into the reaction chamber at a predetermined rate of pressurization of at least no less than approximately 50 millibars per second and preferably more than approximately 200 millibars per second and most preferably more than approximately 500 millibars per second.

23. A method as in claim 1 wherein the treatment gas is rapidly injected into the reaction chamber within a time period of about five seconds.

24. A method as in claim 1 wherein the treatment gas is rapidly injected into the reaction chamber within a time period of about ten seconds.

25. A method as in claim 3 wherein said mixture comprises from about 0.01% to about 1% fluorine and from about 0.01% to about 1% oxygen.

26. A method as in claim 2 wherein said at least one other material is an adhesive.

27. A method as in claim 2 wherein said at least one other material is a paint.

28. A method as in claim 2 wherein said at least one other material is a polymer dissimilar from the article.

29. A method as in claim 1 wherein said at least one polymer is selected from the group consisting of a polymer or copolymer of olefins, styrenes, dienes, epoxies, acrylonitrile, vinyl or vinylidene chloride or fluoride, polycarbonates, polyesters, polyethers, polyacetals, polyacrylates, polymethacryates, polyamides, polyimides, polysulfones, polyphenylene ethers, and polyaryletherketones.

30. A method as in claim 3 wherein said diluent is selected from the group consisting of carbon dioxide, $SF_6$, nitrogen, dry air, argon, helium.

31. A method as in claim 1 wherein the treatment gas is removed from the reaction chamber by evacuation.

32. A method as in claim 1 wherein said step of rapidly injecting a treatment gas into the reaction chamber includes the sub-step of pressurizing the reaction chamber with the treatment gas at a pressurization rate of between approximately 500 millibars per second and approximately 8000 millibars per second, wherein the treatment gas is injected into the reaction chamber in less than about two seconds, the concentration of fluorine in the treatment gas is approximately 100 ppm, the treatment gas is maintained at ambient temperature, and the treatment gas is allowed to react with the articles within the closed reaction chamber for a time period of approximately five seconds.

33. A method as in claim 1 wherein the treatment gas is rapidly injected into the reaction chamber by sparging.

34. A method as in claim 1 comprising the further step of introducing a neutralizing gas into the reaction chamber to lessen the toxicity of the treatment gas prior to removing the treatment gas from within the reaction chamber.

35. A method as in claim 34 wherein said treatment gas includes a concentration of fluorine, said neutralizing gas includes a concentration of hydrogen, and said neutralizing gas reacts with the treatment gas within the reaction chamber to form hydrogen fluoride.

36. A method as in claim 7 wherein said predetermined quantity is approximately equal to three volumes changes of the reaction chamber.

37. A method as in claim 1 wherein said step of removing the treatment gas from within the reaction chamber includes the sub-steps of:

creating a vacuum within the reaction chamber; and, flowing a predetermined quantity of an inert gas through the reaction chamber.

38. A method as in claim 1 wherein said at least one polymer is formed of an elastomeric material.

39. A method as in claim 38 wherein said elastomeric material is either thermoplastic or thermoset and selected from the group consisting of polymers and copolymers of olefins, including chlorinated and partially fluorinated olefins, styrenes, dienes, and acrylonitrile.

40. A method as in claim 1 wherein said method is for surface treating said at least one article to promote wicking.

41. A method as in claim 16 wherein the storage vessel has a gas bladder type construction.

42. A method as in claim 1 comprising the further step of introducing a neutralizing gas into the reaction chamber to ease the recovery of said one or more components.

43. A method as in claim 1 wherein said step of removing said treatment gas from within the reaction chamber further includes the substep of recovering said removed treatment gas.

* * * * *